United States Patent
Klaisner

[19]

[11] Patent Number: 6,115,875
[45] Date of Patent: Sep. 12, 2000

[54] REAR VIEW MIRROR WIPER

[76] Inventor: Richard Klaisner, 8890 East Rd., Redwood Valley, Calif. 95470

[21] Appl. No.: 09/116,973

[22] Filed: Jul. 16, 1998

[51] Int. Cl.$^7$ .................................. B60S 1/56; B60S 1/44
[52] U.S. Cl. .................................. 15/250.003; 15/250.29; 359/507
[58] Field of Search ......................... 15/250.003, 250.29, 15/250.3, 250.002; 359/507

[56] References Cited

U.S. PATENT DOCUMENTS

| | | | |
|---|---|---|---|
| 3,526,920 | 9/1970 | Boyanich | 15/250.003 |
| 3,619,156 | 11/1971 | Riggs | 15/250.003 |
| 4,038,286 | 7/1977 | Medearis et al. | 15/250.003 |
| 4,307,482 | 12/1981 | Palmer | 15/250.003 |
| 4,339,169 | 7/1982 | Addison, Jr. | 15/250.003 |
| 4,527,301 | 7/1985 | Seitz | 15/250.003 |
| 4,653,136 | 3/1987 | Denison | 15/250.003 |
| 4,896,395 | 1/1990 | Bissell | 15/250.003 |

*Primary Examiner*—Gary K. Graham

[57] ABSTRACT

A rear view mirror wiper assembly is provided including a frame with a mirror mounted thereon. Also included is a wiper assembly having at least one slider arm slidably situated along at least one edge of the frame. A wiper blade is mounted to the arm in perpendicular relationship therewith. Next provided is an actuation assembly in communication with the slider arm for selectively moving the wiper blade over the mirror to effect cleaning of the same.

6 Claims, 2 Drawing Sheets

REAR VIEW MIRROR WIPER

BACKGROUND OF THE INVENTION

1. Field of the Invention

The present invention relates to wiper assemblies and more particularly pertains to a new rear view mirror wiper for wiping a rear view mirror clear of any dirt, water, ice or the like to facilitate viewing.

2. Description of the Prior Art

The use of wiper assemblies is known in the prior art. More specifically, wiper assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art wiper assemblies include U.S. Pat. No. 4,306,328; U.S. Pat. No. 4,527,301; U.S. Pat. No. 4,763,381; U.S. Pat. No. 5,150,497; U.S. Pat. No. 4,870,713; and U.S. Patent Des. 327,461.

In these respects, the rear view mirror wiper according to the present invention substantially departs from the conventional concepts and designs of the prior art, and in so doing provides an apparatus primarily developed for the purpose of wiping a rear view mirror clear of any dirt, water, ice or the like to facilitate viewing.

SUMMARY OF THE INVENTION

In view of the foregoing disadvantages inherent in the known types of wiper assemblies now present in the prior art, the present invention provides a new rear view mirror wiper construction wherein the same can be utilized for wiping a rear view mirror clear of any dirt, water, ice or the like to facilitate viewing.

The general purpose of the present invention, which will be described subsequently in greater detail, is to provide a new rear view mirror wiper apparatus and method which has many of the advantages of the wiper assemblies mentioned heretofore and many novel features that result in a new rear view mirror wiper which is not anticipated, rendered obvious, suggested, or even implied by any of the prior art wiper assemblies, either alone or in any combination thereof.

To attain this, the present invention generally comprises a frame having a rear plate with a rectangular configuration. A periphery of the frame is defined by a short top edge, a short bottom edge and a pair of parallel elongated side edges formed therebetween. The frame further includes a planar rectangular mirror mounted on a front surface of the rear plate. A pair of linear lips are mounted to the front surface of the rear plate along the top and bottom edges of the plate. Each lip extends forwardly with a constant U-shaped cross-section thus defining a linear groove. As shown in the Figures, a pair of threaded posts are mounted to a central extent of the top and bottom edges of the rear plate in coaxial relationship. The posts are thus adapted for being pivotally coupled to an exterior of a vehicle. Also included is a wiper assembly having a pair of short slider arms each slidably situated within an associated one of the grooves defined by the lips of the frame. A vertically oriented wiper blade is fixedly and perpendicularly mounted between first ends of the slider arms and in constant abutment with the mirror. Connected between second ends of the slider arms is a rigid connector arm. As best shown in FIGS. 1 & 3, a rod is fixedly coupled to a central extent of the connector arm and extends rearwardly therefrom in perpendicular relationship therewith. Finally, an actuation mechanism includes a motor mounted to a central extent of a rear surface of the rear plate of the frame. A short rotator strip has a first end fixedly mounted to a rotor of the motor. A long rotator strip has a first end rotatably coupled to a second end of the short rotator strip. A second end of the long rotator strip is rotatably mounted to a rear end of the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rear view mirror wiper apparatus and method which has many of the advantages of the wiper assemblies mentioned heretofore and many novel features that result in a new rear view mirror wiper which is not anticipated, rendered obvious, suggested, or even implied by any of the prior art wiper assemblies, either alone or in any combination thereof.

It is another object of the present invention to provide a new rear view mirror wiper which may be easily and efficiently manufactured and marketed.

It is a further object of the present invention to provide a new rear view mirror wiper which is of a durable and reliable construction.

An even further object of the present invention is to provide a new rear view mirror wiper which is susceptible of a low cost of manufacture with regard to both materials and labor, and which accordingly is then susceptible of low prices of sale to the consuming public, thereby making such rear view mirror wiper economically available to the buying public.

Still yet another object of the present invention is to provide a new rear view mirror wiper which provides in the apparatuses and methods of the prior art some of the advantages thereof, while simultaneously overcoming some of the disadvantages normally associated therewith.

Still another object of the present invention is to provide a new rear view mirror wiper for wiping a rear view mirror clear of any dirt, water, ice or the like to facilitate viewing.

Even still another object of the present invention is to provide a new rear view mirror wiper that includes a frame with a mirror mounted thereon. Also included is a wiper assembly having at least one slider arm slidably situated along at least one edge of the frame. A wiper blade is mounted to the arm in perpendicular relationship therewith. Next provided is an actuation assembly in communication with the slider arm for selectively moving the wiper blade over the mirror to effect cleaning of the same.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
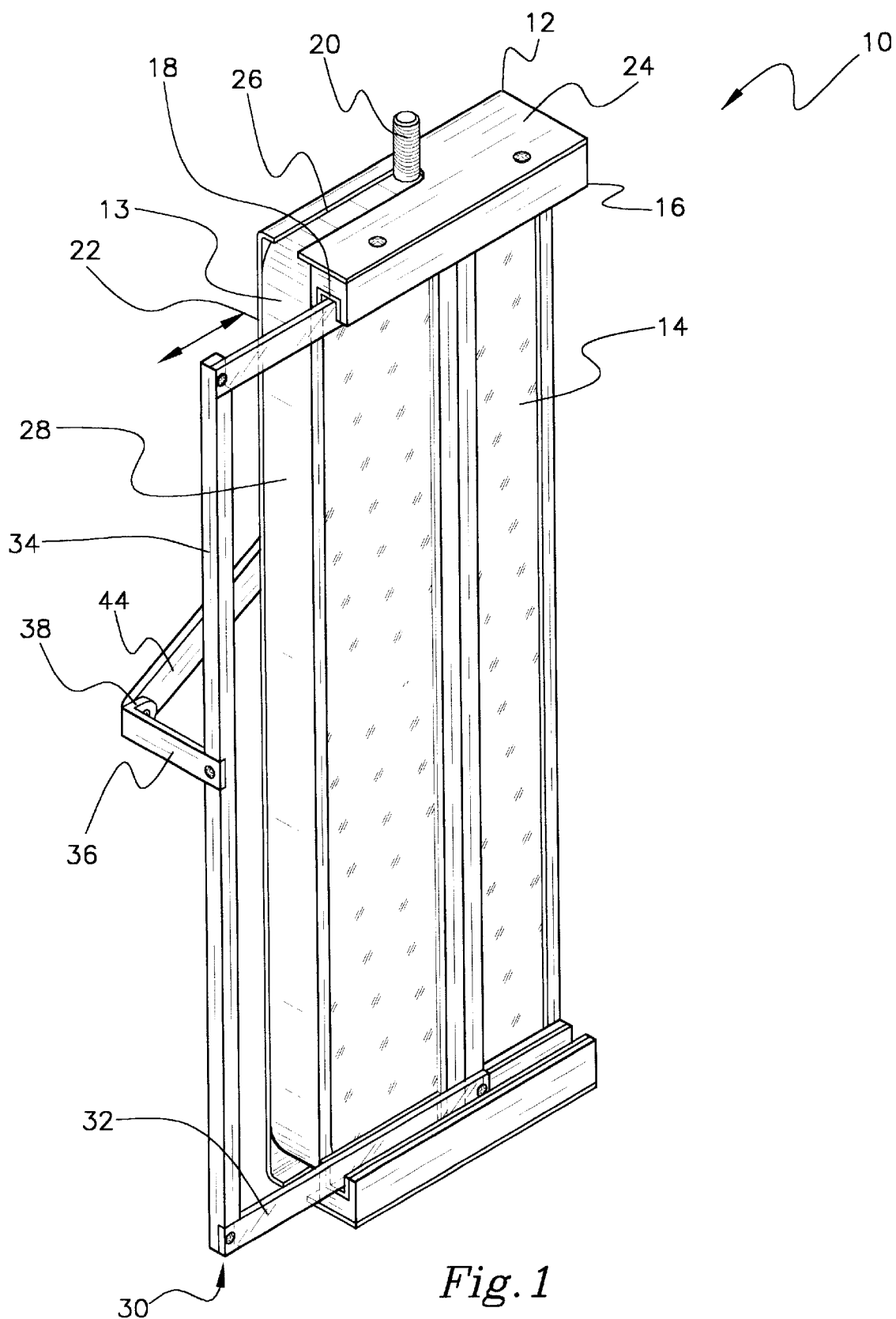
FIG. 1 is a perspective view of a new rear view mirror wiper according to the present invention.
Figure 2:
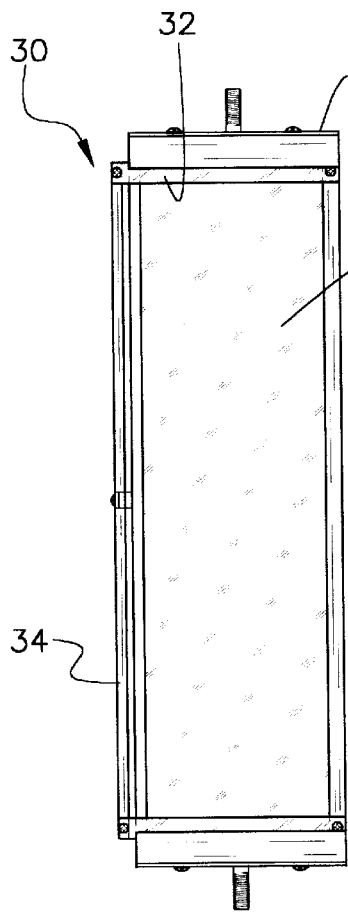
FIG. 2 is a front view of the present invention.

With reference now to the drawings, and in particular to FIGS. 1 through 4 thereof, a new rear view mirror wiper embodying the principles and concepts of the present invention and generally designated by the reference numeral 10 will be described.

The present invention, designated as numeral 10, includes a frame 12 having a rear plate 13 with a rectangular configuration. A periphery of the frame is defined by a short top edge, a short bottom edge and a pair of parallel elongated side edges formed therebetween. The frame further includes a planar rectangular mirror 14 mounted on a front surface of the rear plate.

A pair of linear lips 16 are mounted to the front surface of the rear plate along the top and bottom edges thereof. Each lip extends forwardly with a constant U-shaped cross-section thus defining a linear groove 18. Ideally, the groove is lined with an anti-friction material. As shown in the Figures, a pair of threaded posts 20 are mounted to a central extent of the top and bottom edges of the rear plate in coaxial relationship. The posts are thus adapted for being pivotally coupled to an exterior of a vehicle.

Figure 3:
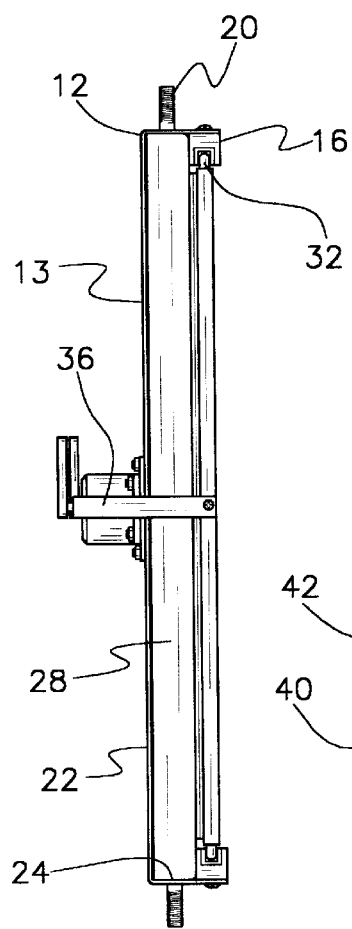
FIG. 3 is a side view of the present invention.
Figure 4:
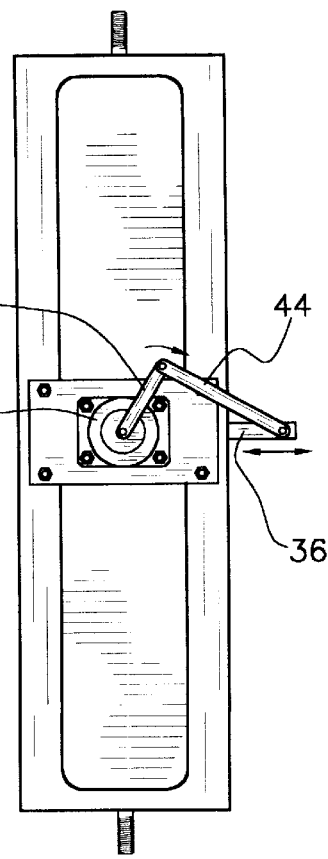
FIG. 4 is a rear view of the present invention.

As best shown in FIGS. 1 & 3, the plate includes a thin rear sheet 22 with an upper and lower forwardly extending strip 24 each of which has an elongated cut out 26 formed therein which is in communication with an edge of the strip. The strips of the sheet are adapted to contain a block 28 of the rear plate which has the posts coupled thereto. As shown in FIG. 1, each of the posts are slidably situated within the associated cut out of the rear plate. Further, outboard edges of the strips are screwably mounted to the lips. The mirror is mounted to a front surface of the block.

Also included is a wiper assembly 30 having a pair of short slider arms 32 each slidably situated within an associated one of the grooves defined by the lips of the frame. A vertically oriented wiper blade is fixedly and perpendicularly mounted between first ends of the slider arms and in constant abutment with the mirror. Connected between second ends of the slider arms is a rigid connector arm 34. As best shown in FIGS. 1 & 3, a rod 36 is fixedly coupled to a central extent of the connector arm and extends rearwardly therefrom in perpendicular relationship therewith. A length of the rod 36 is preferably equal to a width of the rear plate of the frame. Such rod further has a perpendicularly extending apertured tab 38.

Finally, an actuation mechanism includes a motor 40 mounted to a central extent of a rear surface of the rear plate of the frame. A short rotator strip 42 has a first end fixedly mounted to a rotor of the motor. A long rotator strip 44 has a first end rotatably coupled to a second end of the short rotator strip. A second end of the long rotator strip is rotatably mounted to the apertured tab 38 of the rod.

By this coupling, the electric, hydraulic, or pneumatic motor effects the movement of the wiper blade between a first one of the side edges of the rear plate, to a second one of the side edges of the rear plate, and back to the first one of the side edges of the rear plate upon each full rotation of the rotor of the motor. Each rotation of the motor is preferably effected by way of a switch situated within the vehicle. It should be noted that in various alternate embodiments, hydraulics may be used to effect the movement of the wiper assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rear view rear view mirror wiper assembly comprising, in combination:

a frame including a rear plate with a rectangular configuration and having a periphery defined by a short top edge, a short bottom edge and a pair of parallel elongated side edges formed therebetween, the frame further including a planar rectangular mirror mounted on a front surface of the rear plate, a pair of linear lips mounted to the front surface of the rear plate along the top and bottom edges of the plate with each lip extending forwardly with a constant U-shaped cross-section thereby defining a linear groove, and a pair of threaded posts mounted to a central extent of the top and bottom edges of the rear plate in coaxial relationship for being pivotally coupled to an exterior of a vehicle;

a wiper assembly including a pair of short slider arms each slidably situated within an associated one of the grooves defined by the lips of the frame, a vertically oriented wiper blade fixedly and perpendicularly mounted between first ends of the slider arms and in constant abutment with the mirror, a rigid connector arm fixedly connected between second ends of the slider arms, and a rod fixedly coupled to a central extent of the connector arm and extending rearwardly therefrom in perpendicular relationship therewith;

an actuation mechanism including a motor mounted to a central extent of a rear surface of the rear plate of the frame, a short rotator strip having a first end fixedly mounted to a rotor of the motor, and a long rotator strip having a first end rotatably coupled to a second end of the short rotator strip and a second end rotatably mounted to a rear end of the rod, thereby effecting the movement of the wiper blade between a first one of the side edges of the rear plate, to a second one of the side edges of the rear plate, and back to the first one of the side edges of the rear plate upon each full rotation of the rotor of the motor.

2. A mirror wiper assembly comprising:

a frame, the frame having a front and back and a top edge and a bottom edge and a pair of parallel elongated side edges extending between the top and bottom edges, a mirror mounted to said front of said frame, a pair of linear lips extending forwardly from the front at the top and bottom edges of the frame for extending adjacent to a reflective surface of the mirror, the linear lips having a linear groove in each of the linear lips, each groove extending from one side edge to the other side edge;

a wiper assembly including a pair of slider arms, each of the slider arms being slidably situated in one of the linear grooves of the frame and a wiper blade fixedly mounted to the slider arms in substantially perpendicular relationship therewith; and an actuation assembly in communication with the slider arms for selectively moving the wiper blade over the mirror to effect the cleaning of the mirror.

3. A mirror wiper assembly as set forth in claim 2 wherein the actuation assembly includes a motor with a short and long rotator strip in communication with the slider arm for effecting the movement of the wiper blade from a first edge of the mirror, to a second edge of the mirror and back to the first edge of the mirror upon each rotation of the motor.

4. A mirror wiper assembly as set forth in claim 3 wherein the motor is mounted to a rear surface of the frame.

5. A mirror wiper assembly as set forth in claim 2 wherein the frame is pivotally coupled to an exterior of a vehicle.

6. A mirror wiper assembly as set forth in claim 2 wherein a pair of slider arms are included each slidable along opposite edges of the frame with a connector arm mounted between ends of the slider arms to define a rectangle of a size similar to that of the mirror.

* * * * *